May 17, 1960 R. W. HELWIG 2,937,141
SEPARATING VOLATILE COMPONENTS FROM A HEAVY
OIL BY MEANS OF A VENTURI TUBE
Filed Sept. 10, 1957 3 Sheets-Sheet 2
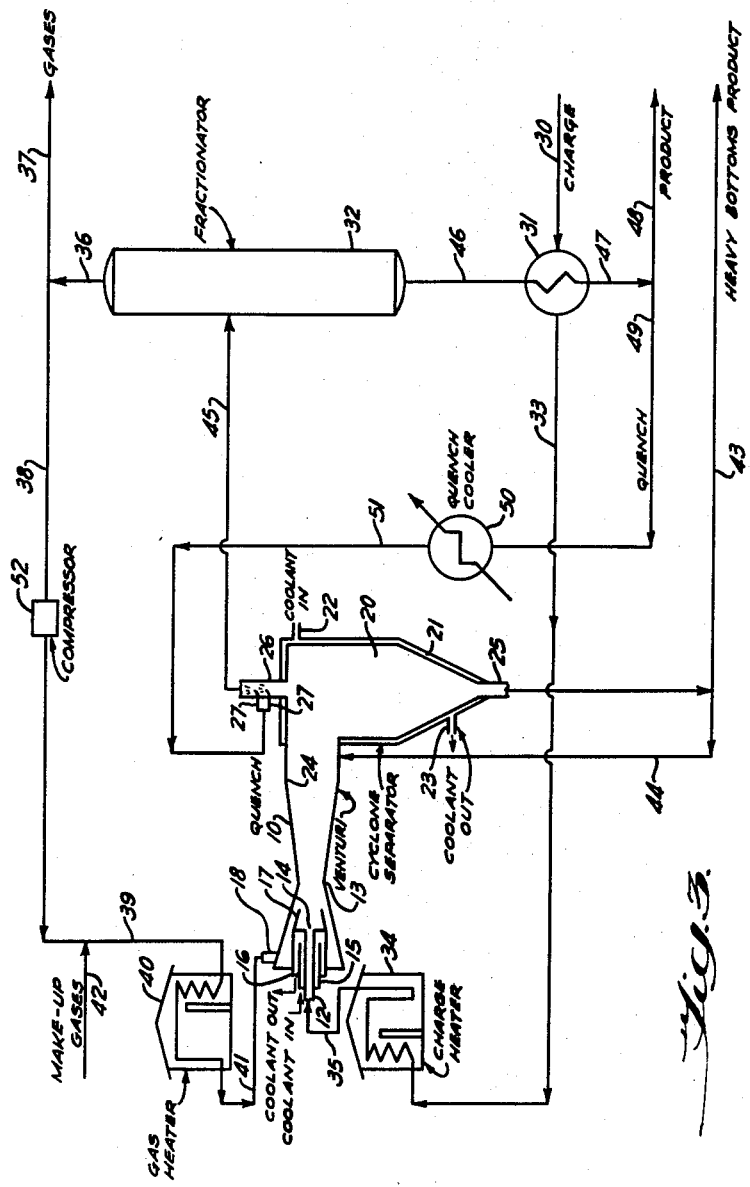
INVENTOR
RALPH W. HELWIG
BY
ATTORNEY

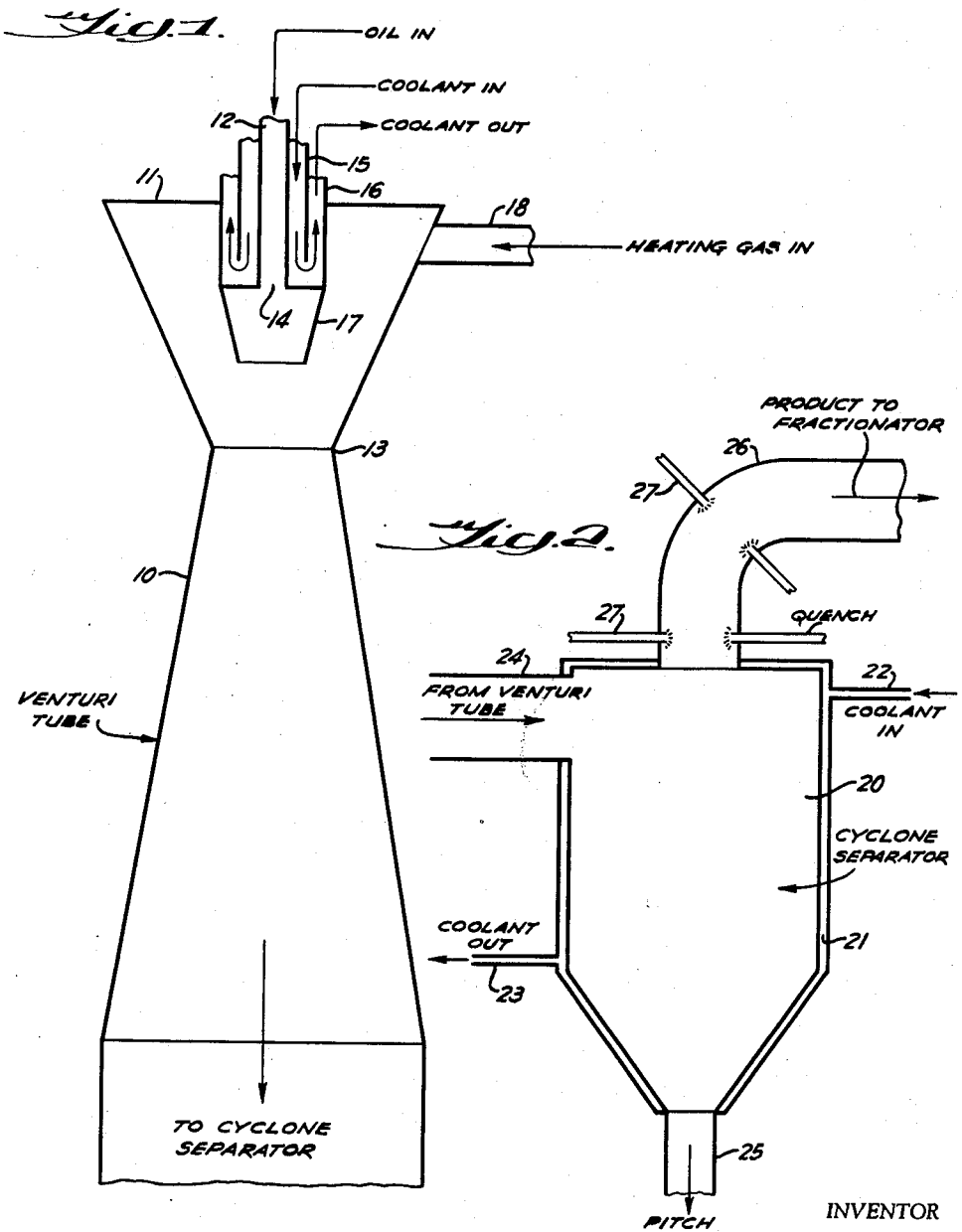

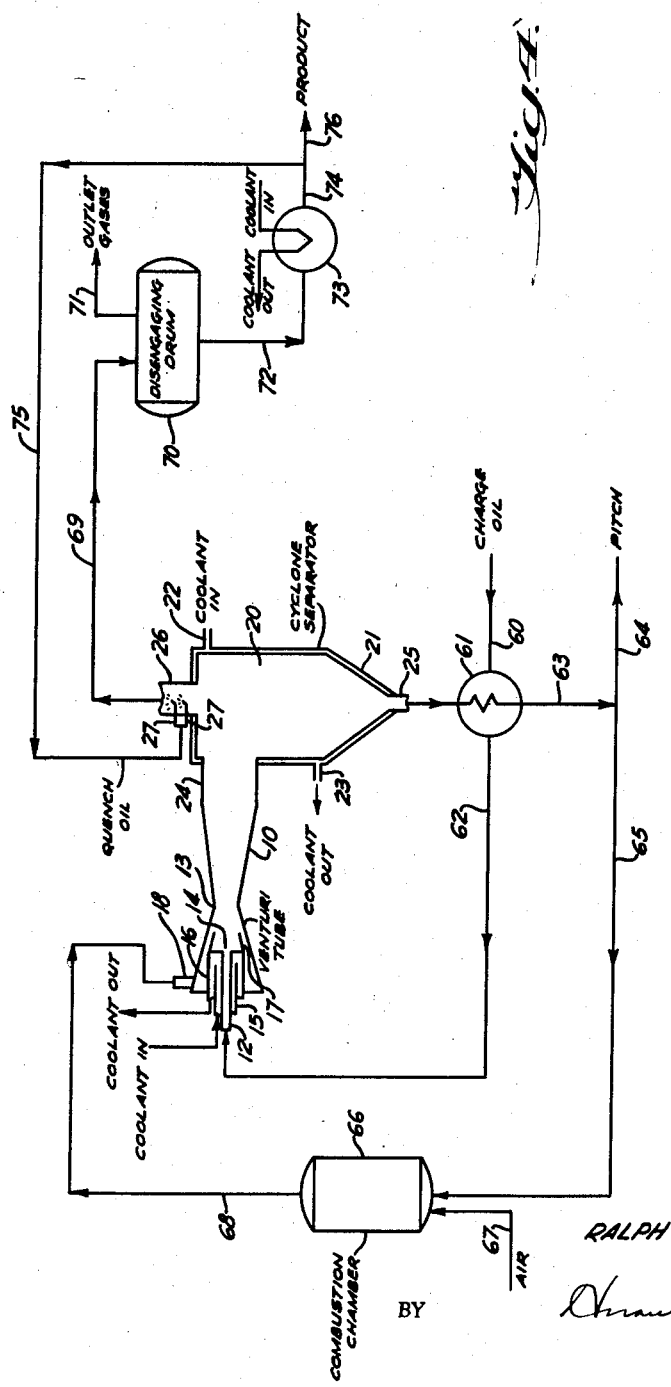

United States Patent Office 2,937,141
Patented May 17, 1960

2,937,141

SEPARATING VOLATILE COMPONENTS FROM A HEAVY OIL BY MEANS OF A VENTURI TUBE

Ralph W. Helwig, Oakmont, Pa., assignor to Gulf Research & Development Company, Pittsburgh, Pa., a corporation of Delaware Application September 10, 1957, Serial No. 683,090

4 Claims. (Cl. 208—361)

This invention relates to a novel method and apparatus for obtaining substantially complete recovery of the lighter components present in a heavy oil charge while minimizing accompanying coking or cracking. More particularly, this invention relates to a novel method and apparatus for atomizing a relatively cool stream of a heavy oil into a stream of high temperature gases, maintaining an extremely short high temperature residence time during which an unvaporized heavy residue is removed from the vaporized lighter components which are carried off by the hot gases, and instantaneously quenching these vapors to recover a substantially uncracked distillate.

Conventional vacuum tower operations are inadequate for the recovery of the volatile components of heavy petroleum stocks such as reduced crudes. The temperature to which such stocks can be heated in a conventional vacuum still or in the preheater of a vacuum flash vaporization unit is limited by the fact that if the stock remains at too high a temperature for too long a time undesirable cracking and coking occur. In an attempt to avoid the occurrence of cracking and coking occasioned during vacuum distillation, volatiles have been recovered from heavy oils by atomizing the heavy oil into a high temperature gas followed by the condensation of the vapors carried off by the gas. However, such atomizing processes still result in a considerable amount of coking and cracking and it is the object of this invention to subject a heavy oil to an atomizing treatment during which the desired volatiles are recovered as a distillate with a nearly complete absence of coking or cracking.

While high temperatures are necessary to effect a substantially complete recovery of volatiles from a heavy oil, it is necessary that the time duration for which the oil is subjected to these high temperatures be extremely short since the degree of cracking and coking depends upon the length of time the oil remains at high temperatures. Thermal decomposition of the oil becomes progressively greater with increased time of exposure to high temperature. However, at sufficiently short exposure times essentially no decomposition occurs. The method and apparatus of this invention permits a high temperature to be employed in order to effect substantially complete recovery of desired volatiles while greatly reducing the time duration for which the oil is subjected to these elevated temperatures, thereby minimizing both cracking and coking of the oil and producing a distillate which is suitable as a catalytic cracking charge stock.

According to the method of this invention, a relatively cool heavy liquid charge, at a temperature below the decomposition range, is atomized into a stream of hot gases which is at a temperature sufficiently high to produce a mixed stream temperature above the cracking temperature of the heavy charge oil. A resulting mixture of vapors and gases is separated from unvaporized bottoms. The vapor and gas stream is maintained above the cracking temperature of the vapors for a time duration of less than one second by rapidly cooling the vaporized components below the decomposition range by means of a quench. This process effects substantial separation of desired volatiles while holding the degree of cracking sufficiently low that the distillate recovered is useful for various purposes such as for a catalytic cracking charge stock.

The method of this invention is carried out in an apparatus comprising a venturi jet with individual ports for the separate admission of a heavy charge oil and hot gases. This venturi jet discharges into a cyclone separator having a bottom discharge line for the removal of unvaporized pitch and an overhead discharge line for the removal of vapors and gases. The overhead discharge line of the cyclone is equipped with spray nozzles for the rapid quenching of passing vapors. The total volumetric capacity of this apparatus is sufficiently small to maintain a residence time not greater than one second for the vapors passing therethrough.

The heavy oil charge to be distilled is atomized and admixed in an atomized state with a hot, inert gas in a novel venturi jet apparatus. This apparatus comprises a venturi tube having a side inlet port for the admission of hot gases upstream from the venturi tube restriction. The oil charge enters through a narrow tube projecting axially into the enclosed end of the venturi tube upstream from the venturi restriction. This tube projects a portion of the distance from the upstream enclosed end of the venturi tube to the restriction and terminates with a jet nozzle. The oil entry port is situated in an axial position in order to attain the most symmetrical and uniform oil dispersion. This axial oil inlet tube is blanketed on its outer surface with a jacket for the circulation of fluid which serves to keep metal surfaces cool and to prevent the charge oil from cracking or coking on hot metal, especially at the small diameter jet nozzle. In addition, the jet nozzle is shielded to reduce heating at that point by the hot gases and to prevent premature vaporization of the liquid jet. These design features serve to protect the charge oil from decomposition temperatures prior to atomization while it is still in the liquid state and its velocity through the system is relatively low in comparison to the tremendous velocity increase accompanying atomization and vaporization.

Once the charge oil is sprayed through the jet and the volatile components vaporize and admix with the hot gases in the venturi, it is essential to quickly separate the vapors from the unvaporized portion of the heavy oil and to quench them almost instantaneously before undesired decomposition occurs. This may be accomplished by passing the entire stream from the venturi into a cyclone-type separator where the liquid droplets will be thrown out by centrifugal force and drawn off at the bottom. The gases and vaporized feed pass out the top of the cyclone and are immediately quenched by means of liquid sprays to a temperature below the decomposition range. The cyclone walls are jacketed for the circulation of a cooling fluid to diminish coking on hot metal surfaces. The volumetric capacities of the cyclone separator and all connecting conduits are designed to be as small as is practicable in order to minimize the high temperature residence time of the vapors.

The method and apparatus of this invention are more particularly illustrated in the following description with reference to the accompanying drawings in which:

Figure 1 shows an enlarged vertical sectional view of an improved venturi tube adapted for use in a venturi jet high temperature distillation system.

Figure 2 is a detail of a separator and quenching apparatus adapted for use in conjunction with the venturi tube shown in Figure 1.

Figure 3 diagrammatically illustrates the improved venturi tube and quenching apparatus of this invention in relation to the other elements in a venturi jet high temperature distillation system.

Figure 4 diagrammatically illustrates the improved venturi tube and quenching apparatus of this invention in relation to the other elements in a modified venturi jet high temperature system.

As long as the charge stock is in the liquid state its rate of flow through the system is relatively low. Therefore it is essential to hold the temperature of the liquid charge well below the decomposition range until the charge is atomized and vaporized at which point its velocity through the system greatly increases due to the great volumetric increase accompanying vaporization and due to the addition of a large quantity of hot acceleration gases. The venturi jet apparatus shown in Figure 1 embodies a greatly improved venturi design which is adapted to maintain the heavy oil charge safely below decomposition temperatures until the oil is atomized through the venturi jet opening.

Figure 1 shows a venturi tube 10 having an enclosed upstream end 11. A narrow tube 12 projects axially into the enclosed end 11 of the venturi tube and extends a portion of the distance from enclosed end 11 to restriction 13 of the venturi tube. The terminus 14 of tube 12 serves as a jet nozzle and is surrounded by a frusto-conical shielding piece 17. Axial tube 12 is surrounded by an inner concentric jacket 15 and an outer concentric jacket 16. As indicated in the drawing, inner and outer concentric jackets 15 and 16 are constructed so that a fluid entering inner jacket 15 has a continuous flow path through this jacket into outer jacket 16 from which it is discharged. A side duct 18 enters the venturi tube at a point upstream from venturi restriction 13.

In operation, a heavy charge oil at a temperature below the decomposition range is fed through axial tube 12 to jet nozzle 14. The charge oil enters through jet nozzle 14 upstream from venturi restriction 13 into the body of venturi tube 10. A cooling fluid is circulated through inner concentric tube 15 which immediately surrounds axial tube 12 and is discharged through the outer concentric tube 16. Cool air, steam, water or a mixture of water and steam are suitable cooling fluids. A heating gas is passed into the venturi through line 18 and serves to rapidly heat, partially vaporize, and disperse the charge as it passes through venturi restriction 13. A mixed stream temperature above the decomposition temperature of the vapors is produced. In order to avoid excessive temperatures at jet nozzle 14 with attendant coking of the liquid adhering to it and to reduce local heating by the hot gases, thereby preventing premature vaporization of the liquid charge in advance of the jet, jet nozzle 14 is shielded from the heat of the hot gases by means of frusto-conical shield 17. The oil entry tube 12 projecting into the venturi is axially situated in order to attain symmetrical and uniform oil dispersion. Although the venturi unit may be horizontal, it is preferably situated vertically for best distribution of the atomized vapors into the hot gases.

The shield and cooling jacket features of the jet shown in Figure 1 maintain the temperature of the charge oil safely below the decomposition range until the oil is atomized and becomes admixed with the hot gases. Following atomization, due to the turbulence and high temperatures employed in the venturi, which are above the decomposition temperature range of the oil, it is essential to separate the vapors from the unvaporized liquid pitch and cool these vapors rapidly in order to minimize cracking. Figure 2 shows a cyclone separator design which is adapted to effect this separation and cooling rapidly.

As shown in Figure 2, cyclone separator 20 has a cooling jacket 21 having a coolant inlet port 22 and a coolant discharge port 23. Duct 24 enters cyclone separator 20 tangentially and the cyclone has a bottom discharge line 25 and an overhead discharge line 26. A plurality of quenching sprays 27 discharge into overhead discharge line 26 as shown.

In operation, the effluent from the venturi tube passes through tangential inlet duct 24 into the body of cyclone separator 20 where the liquid pitch is thrown out from the mixture of gases and vapors and is removed through bottom line 25 while the gases and vapors are withdrawn overhead through line 26 where they are immediately cooled below the decomposition temperature range by means of a cooling fluid spraying through a plurality of nozzles 27. Charring on hot metal is prevented by employing a jacket 21 around the body of the cyclone separator through which a coolant is circulated, the coolant being admitted through port 22 and discharged through port 23.

Figure 3 diagrammatically illustrates the improved venturi tube and quenching apparatus of this invention in relation to the other elements in a venturi jet high temperature distillation system.

Referring to Figure 3, a heavy charge oil is fed into the system through line 30 and is preheated by heat exchanger 31 with the bottoms effluent stream from fractionator 32. The charge oil leaves heater 31 through line 33 and passes into heater 34 where it is further heated prior to entering venturi tube 10 through line 35 and axial inlet tube 12. The charge oil entering the venturi is maintained safely below decomposition temperatures by circulating a cooling fluid through jacket 15 and discharging it through jacket 16. Jackets 15 and 16 are concentric with axial inlet tube 12. Liquid feed at nozzle 14 is below the decomposition range and is protected from coking and premature vaporization by hot gases by means of frusto-conical shielding piece 17. Off gases pass from fractionator 32 through line 36 and are divided into a stream passing through line 37 which leaves the system and a stream passing through line 38 and compressor 52 which is recycled to venturi tube 10 through line 39, gas heater 40 and lines 41 and 18. Make-up gases may be added to the system through line 42 which enters line 39 in advance of gas heater 40. In venturi tube 10, the charge oil issues through jet nozzle 14 and then passes through venturi restriction 13 where it becomes atomized and admixed with the hot gases entering through the side inlet port 18. The mixture passes through duct 24 to cyclone separator 20 where the non-vaporized portion of the charge stock is thrown out on the wall of the separator, then runs down the wall and is finally removed through bottom line 25 and is either removed from the system through line 43 or is partially recycled to the venturi through line 44. The recycled cyclone bottoms passing through line 44 are sprayed into the venturi. These sprayed droplets collect the finer liquid droplets from the venturi jet by impaction and thus aid in their recovery in the cyclone. The use of recycle bottoms may be omitted but should be employed where difficult separations are encountered. Cyclone separator 20 is cooled by means of a jacket 21 to which a coolant is fed through duct 22 and discharged through duct 23. The mixture of gases and vapors leaves cyclone 20 through overhead duct 26, is sprayed with a quenching liquid passing through sprays 27 and then passes through line 45 into fractionator 32 where the condensed vapors and quench oil are separated from the gases. The gases and light vapors are removed from the fractionator through line 36 and are either removed from the system through line 37 or recycled through line 38 as indicated above. A distillate and quench oil stream is removed from the fractionator through bottom line 46 and initially serves to preheat the process charge oil in heater 31 and then is either removed as product through lines 47 and 48 or is partially recycled as a quenching liquid through line 49, cooler 50 and line 51. Line 51 leads to quenching sprays 27. If desired, a cool external fluid may be employed as a quench.

Figure 4 shows the improved venturi jet and quenching apparatus of this invention in relation to the other equipment of a modified venturi jet high temperature distillation system. According to the system shown in Figure 4, a heavy charge stock containing recoverable lighter components is fed through line 60 and is preheated in heater 61 by absorbing heat from the hot liquid pitch effluent from cyclone separator 20. The preheat temperature is safely below the decomposition range of the charge oil. The preheated charge oil then passes through line 62 which leads to venturi tube 10 through axial inlet tube 12. The feed oil is maintained below decomposition temperatures in the venturi feed line by passing a cooling fluid into concentric jacket 15 and discharging the cooling fluid through concentric jacket 16. Liquid feed at jet nozzle 14 is protected from premature vaporization and coking by means of shielding piece 17. The relatively cool charge oil is then passed through jet nozzle 14. A charge stream of gases is separately admitted through side duct 18 and the two streams are intimately admixed in venturi restriction 13 prior to passage through duct 24 which leads to cyclone separator 20. The walls of cyclone separator 20 are cooled to prevent coking on hot metal by means of a cooling jacket 21 to which a coolant is passed through duct 22 and from which the coolant is finally discharged through duct 23. The unvaporized pitch from the charge stock is thrown out from the mixture of vapors and gases in cyclone separator 20 and is removed through bottom line 25 and passed through heater 61. A portion of the pitch leaving heater 61 is passed to storage through lines 63 and 64 while another portion is diverted through line 65 to combustion chamber 66 where it is burned with air entering through line 67 to produce hot flue gases which pass through line 68 to gas inlet line 18 into venturi tube 10. The mixture of gases and vapors pass overhead from cyclone 20 through header 26 where they are rapidly quenched to a temperature below the decomposition range by spraying a portion of the distillate product through spray nozzles 27. The quenched mixture passes through line 69 to disengaging drum 70 from which the flue gases are vented overhead through line 71 and the distillate liquid product is removed through line 72 and passed to cooler 73 prior to being drawn off through line 74. From line 74, a portion of the distillate is recycled as a cool quenching liquid through line 75 and the remainder is removed as product through line 76.

Any heavy oil may be processed by the method of this invention. For example, a residual oil or a crude oil such as a Baxterville or W. Venezuela crude are suitable heavy oils.

In any venturi jet high temperature distillation process, the permissible contact time between the hot gases and the vaporized charge material will vary, depending upon the temperature of the mixed stream and to some extent upon the nature of the liquid charge. In the case of most residual stocks, maintenance of a temperature of 1050° F. for about 0.25 second will result in a decomposition of only slightly in excess of 2%. It is highly desirable that the amount of cracking be kept to a minimum since the distillate obtained is usually intended as a catalytic cracking charge and the presence of olefinic material in such charge results in high coke formation during the catalytic cracking step.

In one application employing the apparatus of this invention, a stream of about 85 gallons per hour of heavy oil (540 molecular weight and 13° API gravity) was preheated to 400° F. and injected into a 3¾ inch venturi. The oil was atomized into droplets of about 20 to 25 microns average diameter and admixed with a stream of 1370 gallons per hour of pentane heated to 1100° F. at atmospheric pressure. The temperature of the mixture resulting was 1045° F. The partial pressure of the oil in the pentane was below 10 mm. Hg, and vapor-liquid equilibrium was quickly attained. Measured at 1045° F., the gas flow through the system amounted to 32 cubic feet per second, and since the size of the cyclone, venturi, and connecting conduit were designed so that the total volume was less than 8 cubic feet, the high temperature contact time was not greater than 0.25 second. At a contact time of 0.25 second, the decomposition was restricted to about 2% of the charge.

The figure of 2% decomposition is in no way limiting, being used only as an example. The residence time may be extended as desired but since the material distilled is primarily intended as a catalytic cracking charge, and since it is desirable to reduce coking during the distillation process itself, it is preferable to maintain a residence time as low as possible.

Since essentially complete equilibrium occurs between the vaporized lighter components and the heavy charge oil due to the rapid attainment of temperature equilibrium as the charge is atomized through the jet into an atmosphere of hot gases, the method of this invention in no way decreases the percentage recovery of volatiles for a given charge stock. On the other hand, the method and apparatus of this invention permit substantially complete recovery of volatiles from a heavy charge oil and at the same time produces a distillate substantially unaffected by cracking or coking and which remains sufficiently saturated to be suitable for subsequent processing steps such as catalytic cracking. The amount of unsaturation occurring to a heavy oil during an exposure time of one second or less above decomposition temperatures will not impair the usefulness of the distillate as a catalytic cracking charge stock. However, since the degree of decomposition at high temperatures progressively increases with time of exposure, a residence time appreciably greater than one second would result in a distillate sufficiently unsaturated so as to coke excessively during a subsequent catalytic cracking step.

Various changes and modifications may be made without departing from the spirit of this invention and the scope thereof as defined in the following claims.

I claim:

1. A process for the recovery of volatile components from a heavy oil which comprises axially projecting said heavy oil while in liquid phase into a venturi tube a portion of the distance from the upstream enclosed end of said venturi tube to the restriction of said tube, separately passing hot gases into said venturi tube upstream from said restriction at a temperature sufficiently high to vaporize the lighter components of said heavy oil upon admixture therewith, maintaining said axially projecting heavy oil substantially completely in liquid phase and below the cracking temperature by surrounding said axially projecting heavy oil with concentric layers of a continuously circulating cooling fluid, said circulating cooling fluid being out of contact with said heavy oil and said hot gases, one of said layers being the cooler and one of said layers being the hotter wherein the cooler layer continuously circulates adjacent to the heavy oil and the hotter layer continuously circulates adjacent to the hot gases, the flow of fluid in each of said layers being countercurrent with respect to each other, spraying said heavy oil into the hot gases, passing said sprayed heavy oil and hot gases through a restricted area to cause the intimate admixture thereof, separating a volatile fraction of said oil from a non-volatile fraction and quenching said volatile fraction to a temperature below the cracking range whereby a substantially uncracked distillate is obtained.

2. A process for the recovery of volatile components from a heavy oil charge comprising axially projecting said charge heavy oil while in liquid phase into a venturi tube a portion of the distance from the upstream enclosed end of said venturi tube to the restriction of said tube, separately passing a charge stream of hot gases into said venturi tube upstream from said restriction at a temperature sufficiently high to vaporize the lighter components of said heavy oil upon admixture therewith, maintaining said axially projecting heavy oil substantially completely in liquid phase and below the cracking temperature by surrounding said axially projecting heavy oil with concentric countercurrent layers of a continuously circulating cooling fluid, maintaining said cooling fluid out of contact with said heavy oil and said hot gases, one of said layers being the cooler and one of said layers being the hotter wherein the cooler layer circulates adjacent to the heavy oil and the hotter layer circulates adjacent to the hot gases, spraying said heavy oil into the hot gases, passing said sprayed heavy oil and hot gases through a restriction of reduced area to form an intimate admixture comprising hot gases, vapors and unvaporized liquid, passing said admixture tangentially into a cyclone separator, separating vapors and gases from liquid in said cyclone separator, injecting a quench oil stream into said vapors and gases, said quench stream being at a temperature sufficiently low to condense and cool said vapors and form a quench oil-distillate mixture having a temperature below the cracking range of the distillate, separating non-condensable gases from said mixture of quench oil and distillate and recycling a portion of said mixture of quench oil and distillate to said quench oil stream, removing a liquid bottoms product from said cyclone separator, passing said liquid bottoms product in heat exchange relationship with charge heavy oil whereby said charge heavy oil is preheated, passing at least a portion of said liquid bottoms product effluent from said preheating step to a combustion chamber, introducing air to said combustion chamber to support the combustion of said heavy bottoms product and passing the flue gases from said combustion chamber to the charge stream of hot gases.

3. A venturi jet apparatus for the maintenance of a heavy oil stream in liquid phase and below the cracking temperature followed by the intimate admixing of said stream with a stream of hot gases comprising a narrow oil inlet tube projecting axially into the enclosed end of said venturi upstream from the venturi restriction and extending a portion of the distance to said restriction, said tube being blanketed on its outer surface with inner and outer concentric jackets defining concentric annular spaces having a common opening on one end to allow a cooling fluid to circulate the length of one of said annular spaces and return the length the other of said spaces, the terminus of said narrow tube comprising a nozzle opening, said venturi jet discharging into a cyclone separator, said cyclone separator having a bottom discharge line and an overhead discharge line, said overhead discharge line being equipped with quenching spray nozzles and the total volumetric capacity being sufficiently small to maintain a residence time not greater than one second for the vapors passing therethrough.

4. A venturi jet apparatus for the maintenance of a heavy oil stream in liquid phase and below the cracking temperature followed by the intimate admixing of said stream with a stream of hot gases comprising a narrow oil inlet tube projecting axially into the enclosed end of a venturi tube upstream from the venturi restriction and extending a portion of the distance to said restriction, said tube being blanketed on its outer surface with inner and outer concentric jackets defining concentric inner and outer annular spaces said inner and outer annular spaces being enclosed at one end, said annular spaces having a common opening connecting them within said enclosed end, said inner and said outer annular space each having an independent port for charging and removing coolant, respectively, at the longitudinally opposite extremity of said annular spaces with respect to said enclosed end.

References Cited in the file of this patent

UNITED STATES PATENTS

| | | |
|---|---|---|
| 248,110 | Park et al. | Oct. 11, 1881 |
| 1,316,770 | Corthesy | Sept. 23, 1919 |
| 1,569,532 | Berry | Jan. 12, 1926 |
| 1,784,561 | Watts et al. | Dec. 9, 1930 |
| 1,860,838 | Leslie | May 31, 1932 |
| 1,920,769 | Stevenson | Aug. 1, 1933 |
| 2,016,798 | Cooke | Oct. 8, 1935 |
| 2,525,276 | Shapleigh | Oct. 10, 1950 |
| 2,708,621 | Shapleigh | May 17, 1955 |
| 2,762,756 | Kinnaird | Sept. 11, 1956 |
| 2,776,931 | Chaney et al. | Jan. 8, 1957 |

FOREIGN PATENTS

| | | |
|---|---|---|
| 480,949 | Germany | Aug. 10, 1929 |
| 297,122 | Great Britain | Nov. 28, 1929 |
| 465,897 | Great Britain | May 14, 1937 |